No. 644,732. Patented Mar. 6, 1900.
J. A. CRANDALL.
CORN CUTTING SPOON.
(Application filed Aug. 24, 1899.)

(No Model.)

Witnesses
G. H. Walmsley.
G. M. Copenhaver.

Inventor
Jesse A. Crandall
by Davis & Davis
his Attorneys

United States Patent Office.

JESSE A. CRANDALL, OF NEW YORK, N. Y., ASSIGNOR TO IRVING T. BUSH AND STEPHEN V. WHITE, OF SAME PLACE.

CORN-CUTTING SPOON.

SPECIFICATION forming part of Letters Patent No. 644,732, dated March 6, 1900.

Application filed August 24, 1899. Serial No. 728,288. (No model.)

*To all whom it may concern:*

Be it known that I, JESSE A. CRANDALL, a citizen of the United States, and a resident of the city of New York, borough of Brooklyn, and State of New York, have invented certain new and useful Improvements in Corn-Cutting Spoons, of which the following is a specification, reference being had therein to the accompanying drawings, in which—

Figure 1:
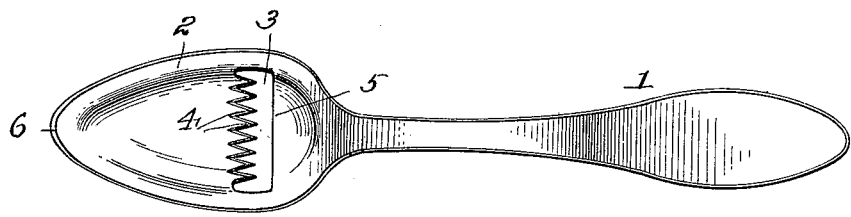
Figure 2:
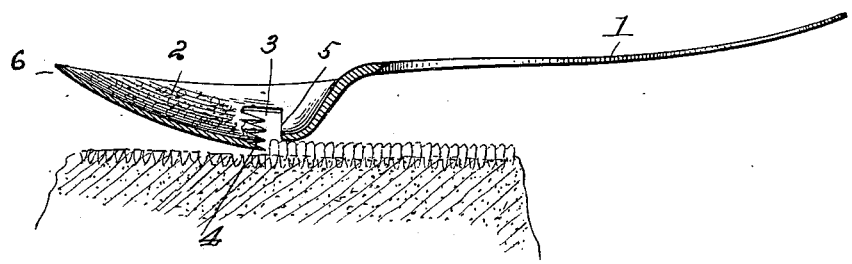

Figure 1 is a plan view of the spoon, and Fig. 2 is a partial longitudinal sectional view thereof.

The object of this invention is to produce a spoon by means of which cooked green corn may be readily cut from the cob and the cut corn be delivered at the front end or point of the spoon-bowl, from which point it may be readily taken into the mouth; and the invention consists in providing a spoon-bowl with a slot or recess and forming teeth on one side of said slot or recess, said teeth extending downward and being adapted to cut corn, being so arranged that the corn cut by them will be delivered into the bowl of the spoon toward the front end or point thereof in position to be taken into the mouth.

Referring to the various parts by numerals, 1 designates the handle of the spoon, and 2 the bowl thereof. Formed in the spoon-bowl near its rear end and extending transversely of the bottom thereof is a slot 3. The forward edge of this slot is serrated to form cutting-teeth 4, which are beveled on their upper sides and at the rear ends extend below the opposite rear edge 5 of the slot, as clearly shown in Fig. 2 of the drawings. From these teeth the bottom of the spoon-bowl inclines upwardly to the delivery or front end 6 thereof.

In use the spoon is grasped in the hand and drawn backward on the ear of corn. The teeth extending below the rear edge 5 of slot 3 will engage the corn and quickly cut it from the cob and deliver it forward into the spoon-bowl, while the bottom of the spoon at the rear edge of the slot rests on the uncut corn. As the corn is cut it passes into the spoon-bowl and is forced forward up the inclined bottom to the front end thereof. It will be seen that the cut corn may be readily taken from the spoon into the mouth without danger of cutting the lips on the teeth 4. The teeth are formed as near the rear end of the bowl as possible in order to remove them from any likelihood of contact with the lips. The slot 3 may be an opening or recess extending in from one side of the bowl, and it need not extend transversely to the bottom of the bowl.

Having thus fully described my invention, what I claim, and desire to secure by Letters Patent, is—

1. A corn-cutting spoon comprising a handle and a bowl, the bowl being formed with an opening therein, cutting-teeth formed integral with one edge of said opening and extending below the opposite edge of the opening, said teeth being adapted to deliver the cut corn into the spoon-bowl.

2. A corn-cutting spoon consisting of a handle and a bowl, the bowl being formed with a transverse slot near its rear end, rearward-extending teeth formed integral with the forward edge of said slot and extending below the rear edge of the slot, the bottom of the bowl inclining upward from the teeth to the forward point of the spoon whereby the cut corn will be delivered to the front end of the spoon away from the teeth.

3. A corn-cutting spoon consisting of a handle and a spoon-bowl, the spoon-bowl being formed with an opening in its bottom, cutting-teeth formed integral with one edge of said opening, said teeth extending below the opposite edge of the opening, the bottom of the spoon-bowl inclining upward from said teeth to the forward or delivery end of the spoon-bowl.

In testimony whereof I hereunto affix my signature, in the presence of two witnesses, this 21st day of August, 1899.

JESSE A. CRANDALL.

Witnesses:
WOLPH HOFFMAN,
PERCY G. B. GILKES.